(12) United States Patent
Furuuchi et al.

(10) Patent No.: US 7,809,719 B2
(45) Date of Patent: Oct. 5, 2010

(54) PREDICTING TEXTUAL CANDIDATES

(75) Inventors: Kenji Furuuchi, Tokyo (JP); Kenichi Morimoto, Kanagawa (JP)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/704,111

(22) Filed: Feb. 8, 2007

(65) Prior Publication Data

US 2008/0195571 A1    Aug. 14, 2008

(51) Int. Cl.
*G06F 17/30* (2006.01)

(52) U.S. Cl. .................................. 707/723

(58) Field of Classification Search ............ 707/7
See application file for complete search history.

(56) References Cited

U.S. PATENT DOCUMENTS

| | | | |
|---|---|---|---|
| 5,377,281 A * | 12/1994 | Ballard et al. ............ 382/229 |
| 5,467,425 A * | 11/1995 | Lau et al. ................. 704/243 |
| 5,805,911 A | 9/1998 | Miller |
| 5,896,321 A | 4/1999 | Miller et al. |
| 5,907,839 A | 5/1999 | Roth |
| 6,204,848 B1 * | 3/2001 | Nowlan et al. ........... 715/810 |
| 6,223,059 B1 * | 4/2001 | Haestrup ................. 455/566 |
| 6,346,894 B1 | 2/2002 | Connolly et al. |
| 6,377,965 B1 | 4/2002 | Hachamovitch et al. |
| 6,578,032 B1 * | 6/2003 | Chandrasekar et al. ...... 707/6 |
| 6,687,697 B2 * | 2/2004 | Collins-Thompson et al. . 707/6 |
| 6,839,667 B2 * | 1/2005 | Reich ...................... 704/240 |
| 6,917,910 B2 | 7/2005 | Itoh et al. |
| 6,970,599 B2 | 11/2005 | Longe et al. |
| 7,031,908 B1 | 4/2006 | Huang et al. |
| 7,111,248 B2 * | 9/2006 | Mulvey et al. ............ 715/812 |
| 7,296,223 B2 | 11/2007 | Chidlovskii et al. ....... 715/234 |
| 7,630,980 B2 | 12/2009 | Parikh ....................... 707/6 |
| 7,657,423 B1 | 2/2010 | Harik et al. ................. 704/9 |
| 2003/0046073 A1 | 3/2003 | Mori et al. |
| 2004/0153975 A1 | 8/2004 | Williams et al. |
| 2005/0017954 A1 * | 1/2005 | Kay et al. ................ 345/169 |
| 2005/0114770 A1 | 5/2005 | Sacher et al. |
| 2006/0173678 A1 | 8/2006 | Gilbert et al. |

(Continued)

FOREIGN PATENT DOCUMENTS

JP      2006185380      7/2006

OTHER PUBLICATIONS

Bower, J., Furuuchi, K., Liu, S., Morimoto, K., Robbins, D., Laughlin, C., Davis, P. , U.S. Appl. No. 11/704,381, filed Feb. 8, 2007, "Context Based Word Prediction", 41 pages.

(Continued)

*Primary Examiner*—Neveen Abel Jalil
*Assistant Examiner*—Kevin Young
(74) *Attorney, Agent, or Firm*—Merchant & Gould

(57) ABSTRACT

Embodiments are provided to predict and suggest one or more candidates. Words, acronyms, compound words, phrases, and other textual and symbolic representations can be predicted and suggested to a user as part of an input process or other user operation. In an embodiment, a number of textual candidates can be predicted based in part on user input and data stored in a store component. The number of predicted textual candidates can be suggested to a user as a number of suggested textual candidates. Embodiments enable a user to select an appropriate textual candidate from the number of suggested textual candidates, while reducing a number of associated user operations.

20 Claims, 4 Drawing Sheets

U.S. PATENT DOCUMENTS

| | | | |
|---|---|---|---|
| 2006/0190436 A1 | 8/2006 | Richardson et al. | |
| 2006/0190447 A1 | 8/2006 | Harmon et al. | |
| 2006/0259479 A1 | 11/2006 | Dai | |
| 2006/0265208 A1* | 11/2006 | Assadollahi | 704/9 |
| 2006/0265648 A1 | 11/2006 | Rainisto et al. | |
| 2008/0076472 A1 | 3/2008 | Hyatt | 455/557 |
| 2008/0306732 A1* | 12/2008 | Ghenania et al. | 704/219 |

OTHER PUBLICATIONS

Komatsu, H., Takabayashi, S., Masui, T., "Corpus-based Predictive Text Input", 6 pages.

Van Den Bosch, A., "Scalable classification-based word prediction and confusable correction", TAL, V. 46—n° Feb. 2005, pp. 39-63, ILK/Language and Information Science, Tilburg University, The Netherlands.

Carlson, A.J., Rosen, J., Roth, D., "Scaling Up Context-Sensitive Text Correction", Department of Computer Science, University of Illinois at Urbana-Champaign, IAAI'01, Copyright 2001, American Association for Artificial Intelligence, 6 pages.

"EMU Manual Vienna University of Technology Institute "integrated study"", Copyright Vienna University of Technology, is-TU, Favoritenstrasse 11/029, A-1040 Vienna, Austria, Apr. 2006, 24 pages.

Chien, Jen-Tzung, "Association Pattern Language Modeling", IEEE Transactions on Audio, speech, and Language Processing, V. 14, No. 5, Sep. 2006, pp. 1719-1728 http://ieeexplore.ieee.org/ie15/10376/35293/01677991.pdf?isNumber=&htry=1.

Johansen, A.S., Hansen, J.P., "Augmentative and Alternative Communication: The Future of Text on the Move", The IT University of Copenhagen, Universal Access in the Information Society (UAIS), V. 5, No. 2, Aug. 2006, pp. 125-149, http://www.itu.dk/courses/U/E2005/forelaeningsslides/UAIS_Textonthemove.pdf.

Lieberman, et al., "Commonsense on the Go", BT Technology Journal, V. 22, No. 4, Oct. 2004, pp. 241-252, http://alumni.media.mit.edu/~tstocky/pubs/Lieberman.Faaborg.Espinosa.Stocky_BT04.pdf.

Vayrynen, Pertti, "Perspectives on the Utility of Linguistic Knowledge in English Word Prediction", Date Nov. 19, 2005, 237 pages, http://herkules.oulu.fi/isbn951427850X/isbn951427850X.pdf.

Komatsu, H., Takabayashi, S., Masui, T., "Corpus-based Predictive Text Input", 6 pages, (2005).

* cited by examiner

PREDICTING TEXTUAL CANDIDATES

BACKGROUND

Computer-implemented word prediction methods attempt to reduce the amount of manual input required by application users. For example, e-mail applications, word processing applications, browser applications, searching applications, etc. use various word prediction algorithms when attempting to predict and suggest words based on a user's input to a respective application. Some word prediction algorithms can (correctly or incorrectly) interpret user input and automatically suggest a corresponding word.

Accordingly, a word prediction method can, in some instances, provide a more efficient and satisfactory experience by accurately predicting and suggesting words to a user. However, some word prediction methods can also operate to disrupt and aggravate users (e.g. displaying an erroneous word list, obstructing the user's work, etc.), thereby detracting from the value of the underlying prediction algorithms. Moreover, current word prediction methods are rarely configured to predict and suggest compound words or phrases, even when the words or phrases are frequently used. Correspondingly, current word prediction methods can be adversely affected by the accuracy and robustness of the underlying word prediction algorithms.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to predict and suggest one or more candidates to a user. In an embodiment, one or more appropriate textual candidates can be predicted and suggested to a user based in part on the user's input, textual context, and/or communication. In one embodiment, one or more textual candidates (e.g. words, acronyms, compound words, phrases, and/or other textual and symbolic representations) can be predicted and suggested based in part on user input and/or a prediction algorithm. The prediction algorithm is configured to predict one or more textual candidates, including next words and/or phrases, using an n-gram probability model and the user input, including previously stored user input. A suggestion component is configured to suggest a number of appropriate textual candidates based on the one or more predicted textual candidates to a user.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to predict and suggest one or more appropriate candidates to a user. For example, a number of words, acronyms, compound words, phrases, and other textual and symbolic representations can be predicted and suggested to a user as part of an input process (word processing, text messaging, digital communication, etc.) or other operation. In an embodiment, a number of textual candidates can be predicted based in part on user input and data stored in a store component. The number of predicted textual candidates can be suggested to the user as a number of suggested textual candidates. Embodiments enable a user to select an appropriate candidate from the number of suggested candidates in fewer operations (e.g. fewer keystrokes, taps, scrolls, etc.).

In an embodiment, a software application having executable instructions is configured to predict and suggest one or more appropriate textual candidates (e.g. words, acronyms, compound words, and/or phrases) based in part on a textual context or communication. The application is configured to predict and suggest one or more textual candidates based in part on user input, including prior user input, and a prediction algorithm. In one embodiment, the prediction algorithm is configured to predict one or more textual candidates using an n-gram probability model and ranking features, but is not so limited.

Figure 1:
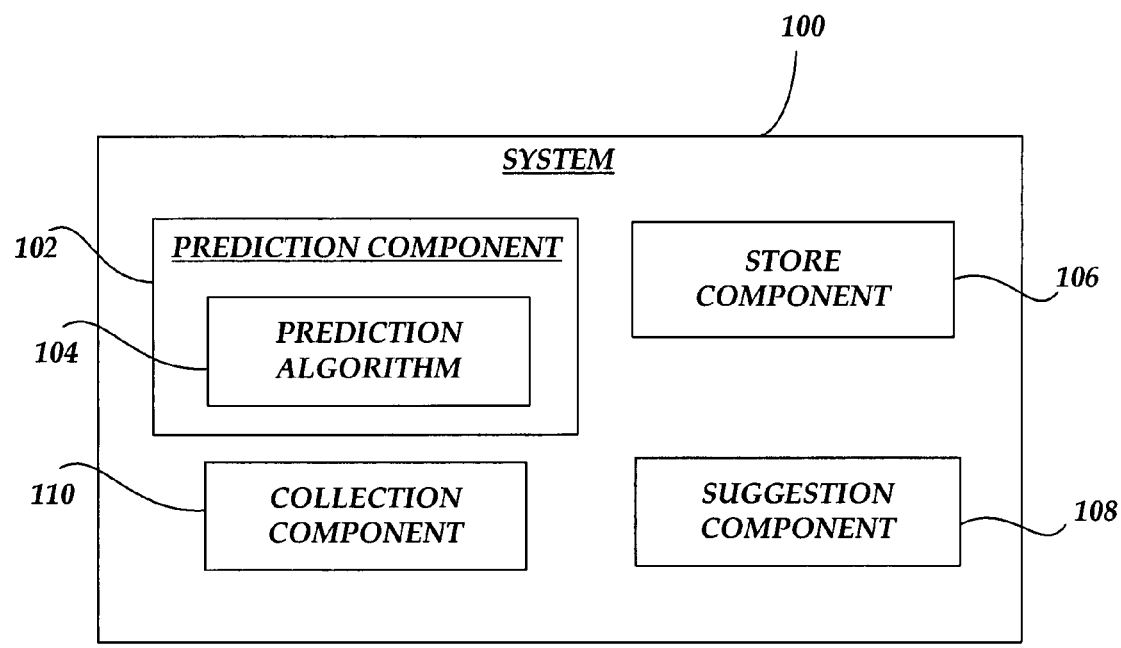
FIG. 1 is a block diagram of an exemplary system to predict textual candidates.

FIG. 1 is a block diagram of a system 100, under an embodiment. In an embodiment, the system 100 is configured to predict and suggest one or more appropriate candidates, such as textual candidates (e.g. words, acronyms, compound words, and/or phrases) based in part on a user operation and/or input, candidate context, and/or a user communication. For example, the system 100 can operate to predict and suggest a following or next word, subsequent word, compound word, acronym, and/or phrase. In one embodiment, the system 100 can be configured as a software application including executable instructions and other functionality which operates to automatically suggest and/or complete a word, compound word and/or phrase based on user input and other stored data.

As shown in FIG. 1, the system 100 includes a prediction component 102 configured to predict a textual candidate. The prediction component 102 can operate to predict a number of textual candidates based in part on user input, textual or candidate context, and/or a user communication, but is not so limited. For example, the prediction component 102 can operate to predict a word, acronym, compound word, phrase, and/or other textual or symbolic representation based in part on a user's input to a device, system, etc. using the system 100. The prediction component 102 can use stored input and/or dictionaries in conjunction with current user input to predict one or more appropriate textual candidates to a user, as described below.

In one embodiment, the prediction component 102 is configured to predict a number of words (e.g. next word, following word, or subsequent word), acronyms, compound words, and/or phrases based in part on user input and a prediction algorithm 104 that includes an n-gram probability model. The prediction algorithm 104 can use data stored in a store component 106 to ascertain a temporal correlation and other pertinent associations for appropriate candidates. In an embodiment, the store component 106 included stored text, which a user has entered, word by word.

The prediction algorithm 104 can operate to pick up words from the store component 106 as candidates and ascertain the temporal correlation and other pertinent associations for these candidates. In one embodiment, the term "word" refers to a string of character(s) that does not include a "separator character", but is not so limited. A separator character refers to a character that is used to divide a string of characters into distinct words. Example separator characters include, but are not limited to, spaces, commas, quotes, and exclamation points. As further example, "MSOFFICE" and "OFFICE10" are words but "Microsoft Office" is not a "word" because it contains the space separator character. Furthermore, the system 100 can predict web and e-mail addresses, such as "www.123-we.net" and "dc8@aol.com" for example.

Moreover, the prediction algorithm 104, including the n-gram probability model, can be used to predict the most probable textual candidates in the current textual context. Accordingly, the system 100 can predict a number of textual candidates given a current user's context. For example, suppose that a user has typed "Microsoft Windows M". The prediction component 102 can use "Microsoft Windows" as preceding words and the letter "M" (as what the user is currently typing) to generate predictive candidates, as described below.

In one embodiment, the prediction algorithm 104 includes:

$$P(w_n | w_{n-N+1}^{n-1}) = k P_{ML}(w_n | w_{n-N+1}^{n-1}) + (1-k) P(w_n | w_{n-N+2}^{n-1}) \quad (1)$$

$$= k_n P_{ML}(w_n | w_{n-N+1}^{n-1}) +$$

$$k_{n-1} P_{ML}(w_n | w_{n-N+2}^{n-1}) + \ldots + k_1 P_{ML}(w_n)$$

$$= k_n \frac{C(w_{n-N+1}^n)}{C(w_{n-N+1}^{n-1})} + k_{n-1} \frac{C(w_{n-N+2}^n)}{C(w_{n-N+2}^{n-1})} + \ldots + k_1 \frac{C(w_n)}{n}$$

wherein, w represents a word in the store component, wherein words are stored to the store component based on user input or operation ($w_1$ is the first word stored in the store component, $w_2$ is the second word stored in the store component, . . . and $w_n$ is the word to be predicted and stored (e.g. stored at a particular location in the store such as a memory location or bin that corresponds with a more recent entry)).

$w_m^n$ represents a sequence of words, from $w_m$ to $w_n$ (e.g. $w_1^2$ represents $w_1 \, w_2$; $w_2^4$ represents $w_2 \, w_3 \, w_4$).

$P(w_n)$ represents the probability of $w_n$.

$P(w_n | w_m^{n-1})$ represents the probability of a word $w_n$ given a preceding sequence $w_m^{n-1}$.

$P_{ML}(\;)$ represents a function to calculate the maximum likelihood estimate of the probability.

$C(w_m^n)$ represents a number of times that a sequence of words $w_m \ldots w_n$ exists in a store component.

$k_i$ represents an interpolation coefficient, where $\Sigma_i k_i = 1$ ($k_i$ values can be determined by a parameter tuning process which is configured to minimize the amount of keystrokes required by a user).

n represents a number of candidates (e.g. words) in the store component.

N represents a number that specifies the length of the word sequence the prediction algorithm 104 uses to predict a number of candidates. That is, N is a number of preceding words that the prediction algorithm uses PLUS 1 (which corresponds with the candidate associated with the current user operation (e.g. typing, inking, or otherwise inputting). For example, if N is equal to 2, the prediction algorithm 104 uses the previous word only when predicting a candidate. That is, if N=2 and a user has input "Windows Mobile", the prediction algorithm 104 uses "Mobile", but not "Windows", to predict the next candidate. Accordingly, if N=3, the prediction algorithm 104 uses "Windows Mobile" when predicting a candidate, such as the next word and/or phrase, as described below. As N is increased, the prediction can be made to be more context-sensitive. N and/or $k_i$ can be modified and tailored to a particular implementation to provide a desired balance between accuracy and performance.

The prediction component 102 can use user input as a string for searching through the store component 102 to locate appropriate candidates. However, if there is no user input after the last separator character, such as a white space, in one embodiment, the prediction component 102 uses the last word of a sequence of preceding words and searches for matches with the last word. The prediction component 102 can return candidates that are next to or follow the last word of the preceding word sequence.

With continuing reference to FIG. 1, the system 100 also includes a suggestion component 108 configured to suggest one or more appropriate textual candidates to a user based on candidates that are predicted by the prediction component 102. For example, the suggestion component 108 can suggest one or more words, acronyms, compound words, and/or phrases to a user as predicted by the prediction component 102 and/or after filtering, ranking, or otherwise limiting the number of suggested textual candidates that are ultimately presented to a user. The suggestion component 108 can thereby suggest the most probable textual candidates based in part on the user input history as stored in the store component 106 in conjunction with the current textual context and/or user input.

In an embodiment, the suggestion component 108 is configured to use ranking information associated with the number of predicted candidates to remove certain predicted candidates before suggesting appropriate textual candidates to the user. By using the ranking information, the suggestion component 108 can limit the number of suggested textual candidates that are ultimately presented to the user. Accordingly, by limiting the number of suggested candidates, the suggestion component 108 is configured to suggest a number of predicted textual candidates in a manner that does not unduly interfere with the user's work or current focus. In one embodiment, the suggestion component 108 can locate or otherwise position suggested textual candidates or a suggested candidate user-interface based on a caret position and/or available space on screen. The suggestion component 108 is configured to suggest one or more predicted textual candidates so that a user can readily select a suggested textual candidate while continuing to focus on a current project.

The system 100 also includes a collection component 110 that is configured to collect textual and other information based in part on user input, but is not so limited. The collection component 110 can collect textual and symbolic information, such as words, acronyms, compound words, and/or phrases. The collected information can then be stored in the store component 106 and used when predicting and suggesting one or more appropriate textual candidates. In one embodiment, the collection component 110 can operate to store user input as a text stream, word by word, along with a tree structured index. The tree structured index can be used when searching the store component 106 for certain data. For example, if a user enters text that consists of multiple words, the collection component 110 is configured to separate the text into individual words and store the words as a text stream in the store component 106. Thus, textual and symbolic representations can be stored by the collection component 110 according to some desired configuration, chronological order for example, in the store component 106.

As described above, if a user enters a text, the collection component 110 is configured to separate the text into individual words or character strings and store these words word by word in the store component 106. In an embodiment, the collection component will not omit any word and stores all words even if these words are duplicated with existing information in the store component 106. Correspondingly, the order of stored words and textual representations can be quickly and efficiently identified, including identifying when (e.g. a temporal association) and how often (e.g. a frequency, number of times, etc.) a word and/or phrase has been used. The store component 106 can also be used to identify a particular context for a word and/or phrase. In an embodiment, the collection component 110 associates identification information with each textual entry for the store component 106. For example, an identification (ID) number can be associated with each storage bin or memory location of the store component 106 (see FIG. 2). In one embodiment, as textual information is stored in the store component 106, information can be moved or re-located from one location (e.g. bin) to another location and a corresponding ID can be used to determine when textual information was entered and/or a particular context associated with the stored textual information.

The system 100 can use frequency information, count information, and/or temporal status, that are identified by using information in the store component 106, in conjunction with one or more thresholds (e.g. ranking thresholds) when determining which candidates to suggest. Other identifiers can be associated with words and/or phrases and stored in the store component 106 to provide additional information regarding entries stored therein.

Accordingly, the store component 106 includes textual information such as words, including frequently used words, acronyms, compound word, phrases and/or other textual information, but is not so limited. According to a desired implementation, the store component 106 can include textual and other information. In alternate embodiments, the store component 106 can be configured as part of external system memory or a file system for example. In one embodiment, the store component 106 is configured as a ring buffer, wherein the collection component 110 stores textual information to the ring buffer based on an index association. As described below, the prediction component 102 can use information stored in the store component 106 to predict textual candidates, such as a next word, compound word, and/or a phrase for example.

As described above, in an embodiment, the prediction component 102 includes a prediction algorithm 104 including an n-gram probability model. The prediction algorithm 104 and the n-gram probability model can be used to model candidate (e.g. word) sequences and other statistical observations. The prediction algorithm 104 can use the statistical properties of n-grams during the modeling process, wherein each n-gram can be based on n words. The prediction component 102 can use information in the store component 106 to identify frequently used words, frequently used compound words, and/or frequently used phrases when predicting and suggesting a particular candidate such as a next word, compound word, and/or phrase for example.

As an example, suppose that a user frequently types the phrase "Windows Mobile" into an ultra-mobile computing device. The prediction component 102 can use the information of the store component 106 to determine frequent entries, recent entries, and other associations (e.g. probabilities, ranking, etc.) to predict the term "Mobile" once the user has typed "Windows". Correspondingly, the number of user operations can be reduced since the user does not need to type "m" or "mo" to get "Mobile" after typing "Windows". That is, the system 100 is configured to provide textual candidates without having the user type a portion of a desired candidate. A user can thereafter select a candidate that is predicted and suggested by the system 100 (e.g. clicking or highlighting a candidate, pressing an assigned key, etc).

Figure 2:
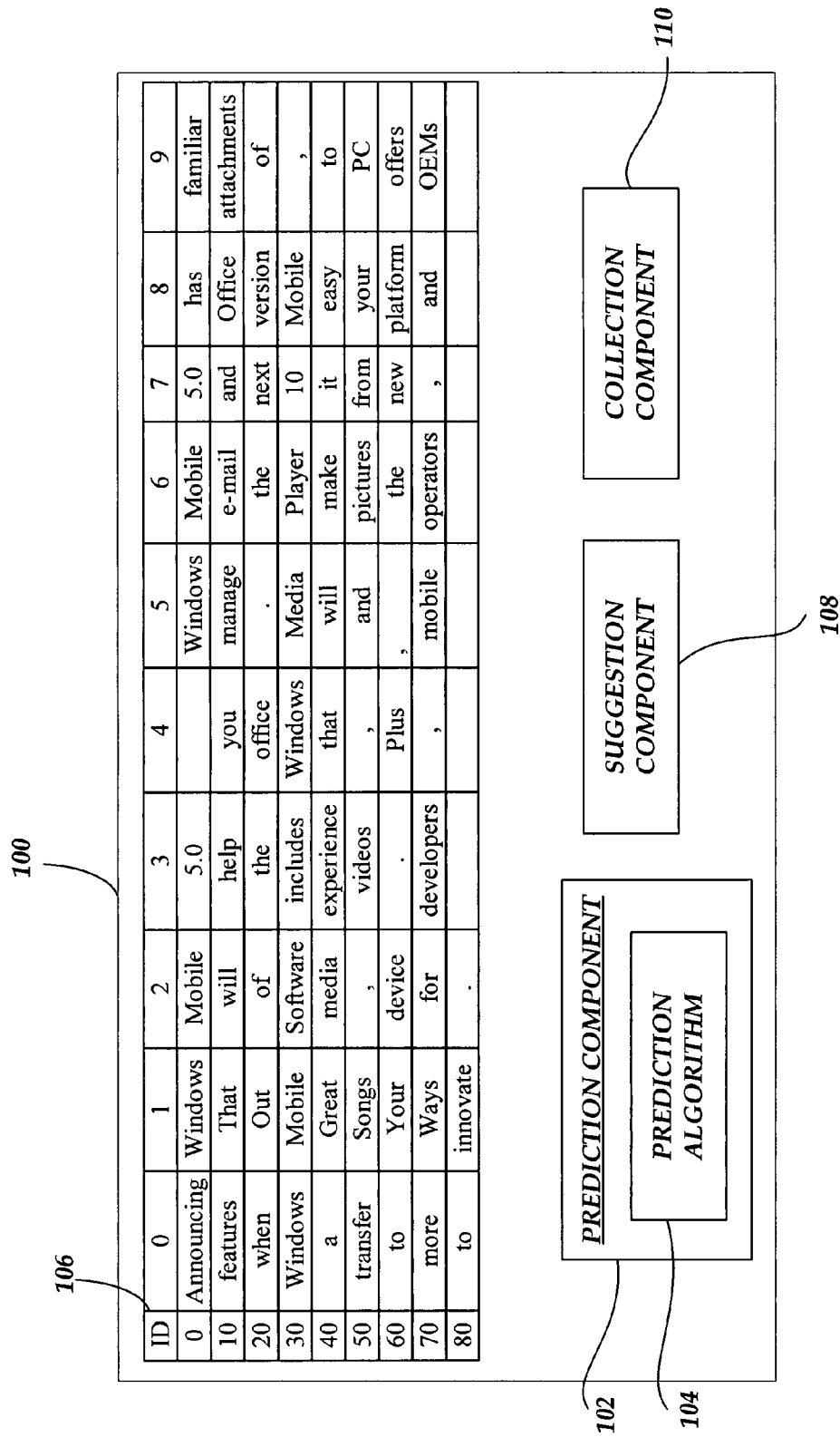
FIG. 2 is a block diagram of an exemplary system to predict textual candidates.

As further example, and as shown in FIG. 2, the store component 106 includes the depicted textual entries as collected and stored by the collection component 110 based on user operations. That is, the collection component 110 operates to store textual information in associated memory locations or bins associated with the store component 106. As shown in FIG. 2, each memory location is associated with a corresponding identification (ID) number (i.e. memory location 1 corresponds with ID=1, memory location 2 corresponds with ID=2, and so on).

In one embodiment, increasing ID numbers are associated with more recent entries in the store component 106. For example, and with continuing reference to FIG. 2, the word "Windows" in memory location having ID=1 is an older entry as compared to the "Windows" entry in the memory location having an ID=5. Correspondingly, the word "Windows" in memory location having ID=5 is an older entry as compared to the "Windows" entry in the memory location having an ID=30. And, the word "Windows" in memory location having ID=30 is an older entry as compared to the "Windows" entry in the memory location having an ID=34. In another embodiment, decreasing ID numbers correspond to more recent entries in the store component 106. As described below, the system 100 can use temporal and other information, associated with each ID for example, to rank and/or limit the number of predicted and/or suggested textual candidates.

Continuing the example, and using equation (1) where the coefficient $k_i$ equals $1/n$, assume that the preceding words on a user's display are "includes Windows" and the user has typed the letter "m". First, the prediction component 102 can search through the store component 106 to locate words that begin with "m" as shown in Table 1 below.

TABLE 1

| ID | Word |
|----|------|
| 2  | Mobile |
| 6  | Mobile |
| 15 | manage |
| 31 | Mobile |
| 35 | Media |
| 38 | Mobile |
| 42 | media |
| 46 | make |
| 70 | more |
| 75 | mobile |

The prediction component 102 can then calculate the probability of words that begin with "m". Thus, the probability of "mobile" can be calculated as:

$$P(\text{mobile}|\text{includes Windows}) = k_3 \frac{C(\text{includes Windows mobile})}{C(\text{includes Windows})} +$$
$$k_2 \frac{C(\text{Windows mobile})}{C(\text{Windows})} + k_1 \frac{C(\text{mobile})}{n}$$
$$= \frac{1}{3} \cdot \frac{0}{1} + \frac{1}{3} \cdot \frac{3}{4} + \frac{1}{3} \cdot \frac{5}{83} = 0.27$$

where n is the total number of words in the store component 106. The probability of other words can also be calculated as shown in Table 2 below:

TABLE 2

| Word | Probability |
|---|---|
| media | 0.425 |
| mobile | 0.270 |
| manage | 0.004 |
| make | 0.004 |
| more | 0.004 |

As described above, if only preceding words are available (i.e. no current input, such as "m" or "mo" for example), the prediction component 102 can set the n value equal to the number of words that were located and returned by the prediction component 102 after performing a search to locate candidates in the store component 106. For example, assume that there is no input string but preceding words include "includes Windows". If user has typed "includes Windows 5.0" before, it's likely that user will type "5.0" again. Even if user has not typed "includes Windows 5.0" before but typed "Windows 5.0", it may still be likely that user will type "5.0" again. Correspondingly, the system 100 is configured to search for "Windows", which is the most recent or latest preceding word.

As shown in FIG. 2, words that are next to "Windows" are "Mobile" and "Media". Thus, "Mobile" and "Media" are considered by the system 100 as candidates. Also, there are 4 occurrences of "Windows" according to this example. Thus, the system 100 can set n equal to 4. Also, C(Windows)=4. Next, the system 100 is configured to search for "includes" that is located in front of and adjacent to "Windows". That is, the system 100 is configured to calculate C("includes Windows") or C("includes Windows" AND a potential candidate).

Since there is one occurrence of "includes Windows Media", C(includes Windows Media)=1. Since there is one occurrence of "includes Windows", C(includes Windows)=1. Since there is one occurrence of "Windows Media", C(Windows Media)=1. Lastly, since there are four occurrences of "Windows", C(Windows)=4. Thus, if the preceding words are "includes Windows", the probability of "media" can be calculated as follows:

$$P(\text{Media}|\text{includes Windows}) = k_3 \cdot \frac{C(\text{includes Windows Media})}{C(\text{includes Windows})} +$$
$$k_2 \cdot \frac{C(\text{Windows Media})}{C(\text{Windows})} + k_1 \cdot \frac{C(\text{Media})}{n}$$
$$= k_3 \cdot \frac{1}{1} + k_2 \cdot \frac{1}{4} + k_1 \cdot \frac{1}{4}$$

In one embodiment, the prediction component 102 can predict a number of phrases by appending one or more appropriate words after performing a prefix search to locate pertinent words in the store component 106. For example, assume the prediction component 102 has returned the word list of Table 3 after performing a prefix search based on a user's input.

TABLE 3

| ID | Word |
|---|---|
| 2 | Mobile |
| 6 | Mobile |
| 15 | manage |
| 31 | Mobile |
| 35 | Media |
| 38 | Mobile |
| 42 | media |
| 46 | make |
| 70 | more |
| 75 | mobile |

Using the list of Table 3, the prediction component 102 can operate to create the following phrases as shown in Table 4 below.

TABLE 4

| ID | Phrase | |
|---|---|---|
| 2 | Mobile | 5.0 |
| 6 | Mobile | 5.0 |
| 15 | Manage | e-mail |
| 31 | Mobile | Software |
| 35 | Media | Player |
| 38 | Mobile | break |
| 42 | Media | experience |
| 46 | Make | it |
| 70 | more | ways |
| 75 | mobile | operators |

After creating the phrases, the prediction component 102 can list unique phrases, calculate a count of the unique phrases, and remove phrases having a count less than or equal to a certain threshold (e.g. removal phrases associated with a threshold equal to 1). In the example above, the prediction component 102 will retain "mobile 5.0" since the count is 2, as shown by Tables 5 and 6 below.

TABLE 5

| Phrase | Count |
|---|---|
| mobile 5.0 | 2 |

TABLE 6

| ID | Phrase | |
|---|---|---|
| 2 | Mobile | 5.0 |
| 6 | Mobile | 5.0 |

The prediction component 102 can continue to append one or more subsequent words to the created phrase list to create longer phrases. In one embodiment, the prediction component 102 can be configured to not append subsequent words if the last word is a separator character, such as a sentence break for example. In another embodiment, the prediction component 102 can limit phrases to not contain more than W words. For example, if W=2, a phrase "Windows Media" can be predicted but "Windows Media Player" will not be predicted. The W value can be controlled using a setting, such as a registry setting for example, described below.

The prediction component 102 can calculate phrase probability using a predicting algorithm that includes the following:

$$P(w_n^{n+N}) = \prod_{i=0}^{N} P(w_{n+i} \mid w_n^{n+i-1}) \quad (2)$$

$$= P(w_n)\frac{C(w_n^{n+1})}{C(w_n)}\frac{C(w_n^{n+2})}{C(w_n^{n+1})}\cdots\frac{C(w_n^{n+N})}{C(w_n^{n+N-1})}$$

$$= P(w_n)\frac{C(w_n^{n+N})}{C(w_n)}$$

where:

$w_n \ldots w_{n+N}$ is a phrase (e.g. "Mobile 5.0").

$C(w_n)$ is the number of times the candidate (e.g. word, phrase, etc.) $w_n$ is observed in the store component 106.

$C(w_n^{n+N})$ is the number of times the sequence of candidates $w_n \ldots w_{n+N}$ is observed in the store component 106. For example, the probability of "mobile 5.0" can be calculated as follows:

$$P(\text{mobile 5.0}) = P(\text{mobile})\frac{C(\text{mobile 5.0})}{C(\text{mobile})} = 0.270 \cdot \frac{2}{5} = 0.108$$

The prediction component 102 can also be configured to merge any unique word and/or phrase lists and sort by probability. For example, as shown in Table 7 below, the prediction component 102 has merged unique words and phrases to create a merged list, and also has sorted the merged list by probability.

TABLE 7

| Candidate | Probability |
|---|---|
| media | 0.425 |
| mobile | 0.270 |
| mobile 5.0 | 0.108 |
| more | 0.004 |
| make | 0.004 |
| manage | 0.004 |

The prediction component 102 can be further configured to merge the raw word/phrase lists, including the ID information. Thereafter, the prediction component 102 can sort the list by ID in some desired order (e.g. descending, ascending, etc.). For example, as shown in Table 8 below, the prediction component 102 has merged the raw word/phrase lists described above and sorted the list by ID in descending order.

TABLE 8

| ID | Word/Phrase |
|---|---|
| 75 | mobile |
| 70 | more |
| 46 | make |
| 42 | media |
| 38 | mobile |
| 35 | Media |
| 31 | mobile |
| 15 | manage |
| 6 | Mobile |
| 6 | Mobile 5.0 |
| 2 | Mobile |
| 2 | Mobile 5.0 |

The prediction component 102 can thereafter remove shorter words and/or phrases according to a desired implementation. In one embodiment, the prediction component 102 can operate to remove words and/or phrases having a length that is less than Y. The Y value can also be controlled by using a setting, such as a registry setting for example as described below. The prediction component 102 can also remove a word and/or phrase that is the same as the input string.

Once the prediction component 102 has removed any shorter words and/or phrases, the prediction component 102 can then eliminate less probable candidates. In one embodiment, the prediction component 102 is configured to select the top Z candidates in the unique list. For each candidate, the prediction component 102 searches for a match in the raw list and selects a match having the largest ID, as shown by Table 9 below.

TABLE 9

| ID | Candidate | Probability |
|---|---|---|
| 42 | media | 0.425 |
| 75 | mobile | 0.270 |
| 6 | Mobile 5.0 | 0.108 |
| 70 | more | 0.004 |
| 46 | make | 0.004 |
| 15 | manage | 0.004 |

Again, the prediction component 102 can be configured to retain the top Z candidates and eliminate others. The Z value can also be controlled by using a setting, such as a registry setting for example, as described below. In one embodiment, the prediction component 102 will prioritize an item that has a higher ID if multiple items have the same probabilities, as shown in Table 10 below.

TABLE 10

| ID | Candidate | Probability |
|---|---|---|
| 42 | Media | 0.425 |
| 75 | Mobile | 0.270 |
| 6 | Mobile 5.0 | 0.108 |
| 70 | More | 0.004 |

As described above, the prediction component 102 can also adjust candidate probability based on the candidate ID. In one embodiment, the prediction component 102 operates to sort candidates by ID in an ascending order as shown in Table 11 below. If the ID is the same for multiple candidates, a longer candidate is given priority.

TABLE 11

| Rank | ID | Candidate | Probability |
|---|---|---|---|
| 1 | 6 | Mobile 5.0 | 0.108 |
| 2 | 42 | media | 0.425 |
| 3 | 70 | more | 0.004 |
| 4 | 75 | mobile | 0.270 |

In an embodiment, the prediction component 102 is further configured to adjust the probability based on rank as follows:

$$P_{adj}(W_n) = m_1 \times P(W_n) + m_2 \times f(\text{Rank}) \quad (3)$$

where $m_1 + m_2 = 1$, and $m_1$ and $m_2$ are variables that can be configured to provide the desired candidates. For example, $m_1$ and $m_2$ can be modified to achieve minimum number of user key strokes required to obtain a desired candidate;

Padj corresponds with an adjusted probability.

$$f(\text{Rank}) = \text{Rank}/((Z+1) \times Z/2) \quad (4)$$

The following provides an example of the probability calculation for the word "mobile" assuming that $m_1=m_2=\frac{1}{2}$.

$$P_{adj}(\text{"mobile"}) = 1/2 \times 0.270 + 1/2 \times f(4)$$
$$= 1/2 \times 0.270 + 1/2 \times 4/((4+1) \times 4/2)$$
$$= 1/2 \times 0.270 + 1/2 \times 4/10$$
$$= 1/2 \times 0.270 + 1/2 \times 4/10$$
$$= 0.335$$

The remaining probability calculation results are shown in Table 12 below.

TABLE 12

| Candidate | Probability |
|---|---|
| Mobile 5.0 | 0.104 |
| Media | 0.313 |
| More | 0.152 |
| Mobile | 0.335 |

Thereafter, the prediction component 102 can sort the candidates by the adjusted probability, as shown in Table 13 below. As described above, if the probability is same, the longer candidate will be given priority.

TABLE 13

| Candidate | Probability |
|---|---|
| Mobile | 0.335 |
| Media | 0.313 |
| More | 0.152 |
| Mobile 5.0 | 0.104 |

As described above, $k_j$, $m_i$, W, X, Y and Z values can be set using a number of registry settings for example.

Figure 3:
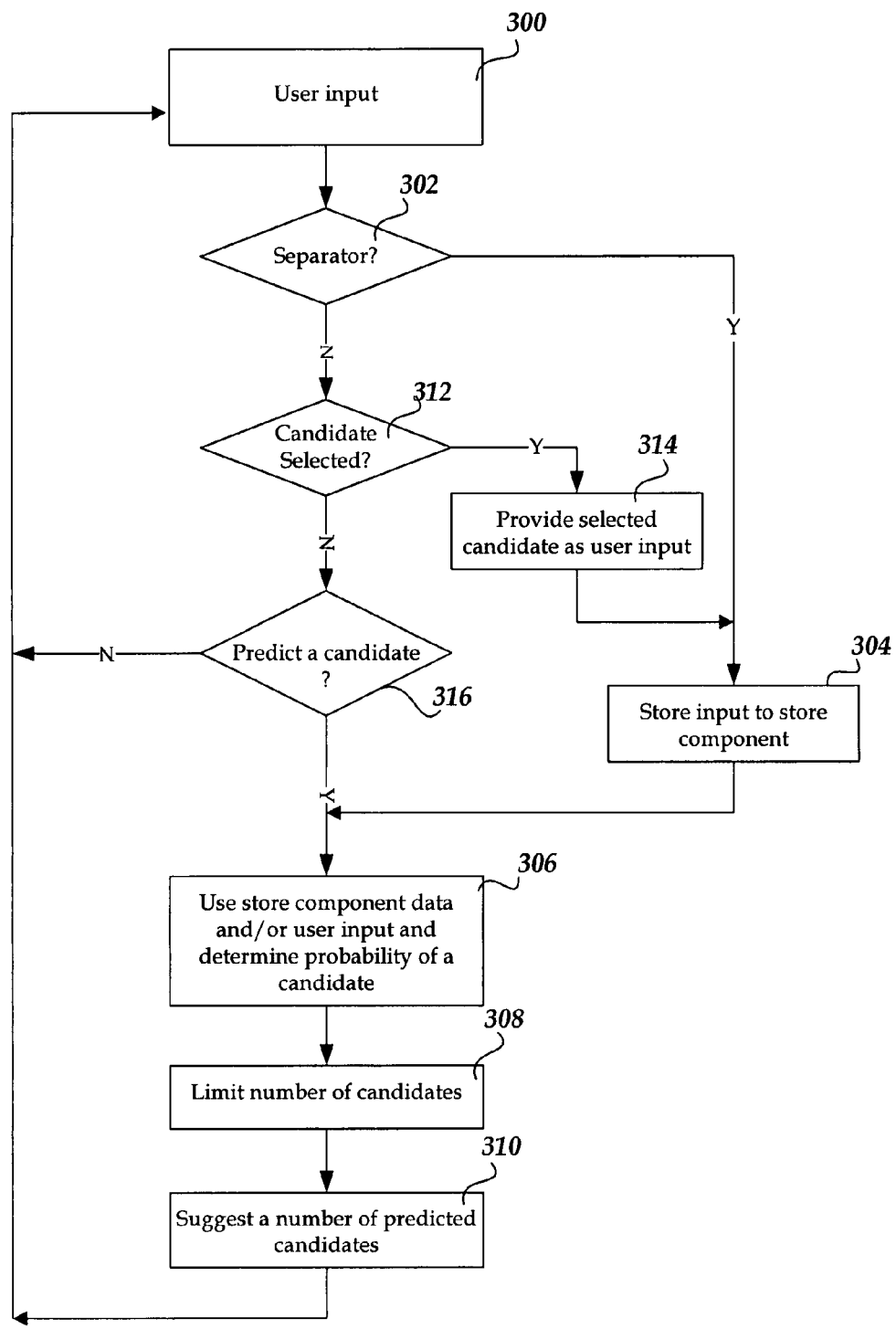
FIG. 3 is a flow diagram illustrating predicting and suggesting a textual candidate.

FIG. 3 is a flow diagram illustrating the prediction and suggestion of a candidate, such as a textual, symbolic, or other representative candidate for example, under an embodiment. The components of FIG. 1 will be used in describing the flow diagram, but the embodiment is not so limited. At 300, a user operation occurs. For example, a user may be using an application associated with a handheld device to correspond with another user by keying input such as a character, cursor, enter, etc.

At 302, the system 100 determines if the user operation is associated with a separator character or operation, such as an input associated with a space for example. For example, the system 100 can determine if the user operation terminates a word or a meaningful number of characters. If the system 100 determines that the user operation is associated with a separator character, at 304, the collection component 110 collects information associated with the user operation and stores the information in the store component 106. For example, the collection component 110 can operate to collect and store the text a user has entered as part of a textual communication operation.

The flow then proceeds to 306 where the prediction component 106 can determine the probabilities of multiple candidates, including next or subsequent words and phrases for example. As described above, the prediction component 106 can use data in the store component 106 and/or user input to determine a candidate probability. At 308, a limiting procedure, such as a ranking algorithm, can be used by the system 100 to limit the number of candidates that are to be suggested to the user. At 310, after any limiting procedure, the remaining candidates can be suggested or recommended to the user by the suggestion component 108. The flow returns to 300 and the system 100 awaits further user input.

If the user operation is not associated with a separator character, the flow proceeds to 312 and the system 100 determines if a candidate has been selected. If the user has selected a candidate (e.g. mouse click, cursor keys, etc.), at 314 the system 100 operates to provide the selected candidate to the user and stores the candidate in the store component 106 at 304. If the user has not selected a candidate at 312, the flow proceeds to 316 and the system 100 determines whether to perform a prediction operation. In one embodiment, a prediction will not be performed based on certain user operations or input. For example, the system 100 will not make a prediction if a user press a down arrow key, an ESC key, a Print Screen key, a Home key, an End key, an Insert key, certain mouse clicks, etc.

If a prediction operation is not required, the flow returns to 300. If a prediction operation is required, the flow proceeds to 306 and the prediction component 106 can determine the probabilities of multiple candidates. At 308, a limiting procedure can be used by the system 100 to limit the number of candidates that are to be suggested to the user. At 310, after any limiting procedure, the remaining candidates can be suggested or recommended to the user by the suggestion component 108. Thereafter, the flow returns to 300 and the system 100 awaits further user input.

In an embodiment, the system 100 includes an auto-correct feature. If the auto-correct feature is enabled and a preceding word was corrected, the system 100 uses the corrected word to predict and suggest candidates based thereon. In one embodiment, the system 100 shows next word suggestions as predicted once a user finishes typing a word and presses a space (or some other auto-correct trigger keys). To provide suggestions at this time, the system 100 passes the preceding words to the prediction component 102 which can operate to return words and/or phrases that are likely to follow.

According to an embodiment, the system 100 can be configured as a software application that includes instructions that when executed are configured to predict and suggest a textual candidate, such as a word, acronym, compound word, and/or phrase based in part on user input to a host system running the software application. The software application can be implemented as part of the functionality of an ultra-mobile portable computing device, such as a WINDOWS Mobile-based Pocket PC, to predict and suggest words, compound words and/or phrases based in part on user input to the device.

In such an implementation, the suggestion component 108 can be configured to display a candidate window with appropriate textual suggestion(s) without substantially interfering with the user's focus. For example, the suggestion component 108 can position or otherwise locate suggested textual candidates that enable a user to quickly select a candidate without unduly obstructing the user's view. In an embodiment, the components of the system can be configured to capture, predict, and suggest ink-based input as well as typed input.

As described above, the system 100 can be configured as a software application (see FIG. 4 prediction and suggestion application 24) that can be executed on a client computing device, such as an ultra-mobile computing device for example. According to such an embodiment, a textual store 25 can be stored locally (e.g. system memory 12 of FIG. 4), wherein textual information can be written and/or accessed from the textual store 25 accordingly.

The system 100 can be employed in a variety of computing environments and applications. For example, the system 100 can used with computing devices having networking, security, and other communication components configured to provide communication functionality with other computing and/or communication devices. Such computing devices include desktop computers, laptop computers, tablet computers, handheld devices (e.g. smart phone, ultra-mobile personal computer, etc.), and/or other communication devices.

The embodiments described herein can be used with a number of applications, systems, and other devices and are not limited to any particular implementation or architecture. Also, while certain data structures, component features, and predictive functionality has been described herein, the embodiments are not so limited and can include more complex data structures, features, and other functionality. Accordingly, the embodiments and examples described herein are not intended to be limiting and other embodiments are available.

Exemplary Operating Environment

Figure 4:
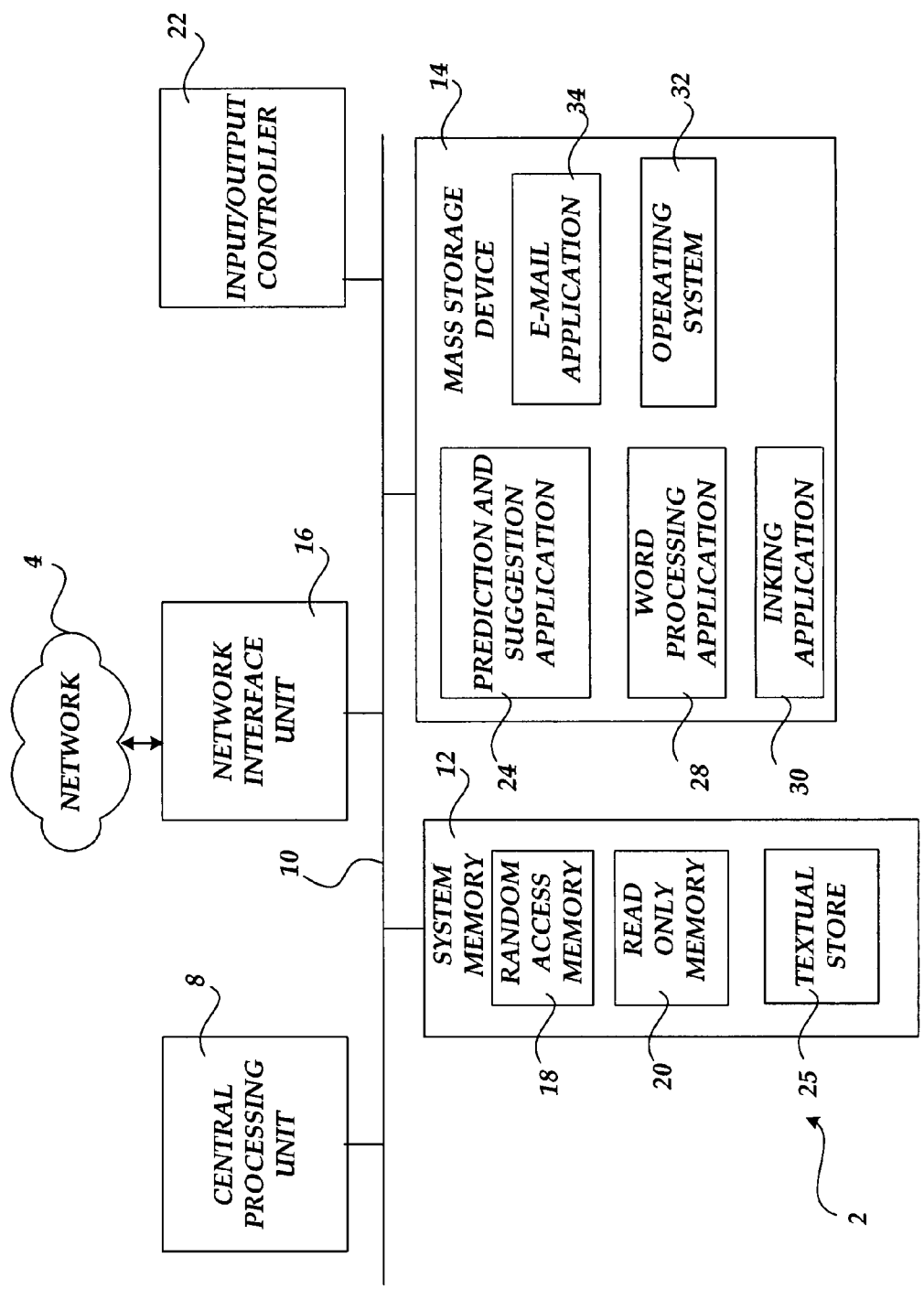
FIG. 4 is a block diagram illustrating a computing environment for implementation of various embodiments described herein.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM"), a read-only memory ("ROM") 20, a textual store 25, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, such as a prediction and suggestion application 24, and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. for example. The mass storage device 14 and RAM 18 may also store one or more program modules. In particular, the mass storage device 14 and the RAM 18 may store other application programs, such as a word processing application 28, an inking application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer readable storage medium including executable instructions which, when executed, assist a user by:
receiving input associated with a user operation;
storing the input in a store component in a chronological order;
predicting a number of textual candidates based in part on the user operation and a number of preceding textual words in the store component, wherein the predicting comprises:
determining a number of textual candidate probabilities, wherein each textual candidate probability is based in part on a first quantity that corresponds with a number of times the textual candidate follows the number of preceding textual words in the store component and the number of times that the number of preceding textual words occur in the store component and a second quantity that corresponds with a number of times the textual candidate is observed in the store component and the total number of words in the store component;
selecting a number of top textual candidates based on the textual candidate probabilities;
determining adjusted probabilities of the selected top textual candidates, wherein each adjusted candidate probability is based in part on a candidate rank function multiplied by a first variable and an associated textual candidate probability multiplied by a second variable, wherein the candidate rank function is based in part on a third quantity that corresponds with the selected top textual candidate rank values; and
displaying the selected number of top textual candidates ranked by the adjusted candidate probabilities.

2. The computer-readable storage medium of claim 1, wherein the instructions, when executed, assist a user by predicting the number of textual candidates using data stored in a textual store to locate one or more of the number of preceding textual word associated with the user operation, wherein the data is further used to determine recent textual candidates and the candidate rank function is based on a rank value of each of the select number of the textual candidates and a fourth quantity that includes the select number of textual candidates plus a fixed value multiplied by a select portion of the number of the textual candidates.

3. The computer-readable storage medium of claim 1, wherein the instructions, when executed, assist a user by predicting the number of textual candidates including using data in a textual store to determine a number of recent words and using a threshold when suggesting the number of suggested textual candidates.

4. The computer-readable storage medium of claim 1, wherein the instructions, when executed, assist a user by predicting the number of textual candidates including using an occurrence frequency of the number of preceding textual candidates when suggesting the number of suggested textual candidates.

5. The computer-readable storage medium of claim 1, wherein the instructions, when executed, assist a user by suggesting the number of suggested textual candidates based in part on a separator determination and selecting one of the suggested textual candidates as an appropriate textual candidate.

6. The computer-readable storage medium of claim 5, wherein the instructions, when executed, assist a user by appending the appropriate textual candidate to a textual store and using the appropriate textual candidate when predicting future textual candidates.

7. The computer-readable storage medium of claim 1, wherein the instructions, when executed, assist a user by predicting at least one or more textual candidates, wherein the one or more textual candidates are selected from at least one of a predicted next word or a predicted phrase.

8. The computer-readable storage medium of claim 7, wherein the instructions, when executed, assist a user by predicting at least one of a next word or a phrase, wherein the predicting of the at least one of the next word or phrase is based in part on a candidate context associated with the user operation and the user operation is associated with a separator character.

9. The computer-readable storage medium of claim 7, wherein the instructions, when executed, assist a user by predicting at least one of a next word or a phrase including using at least one of a word frequency, word order, or a number of preceding words when predicting the at least one of the next word or phrase.

10. The computer-readable storage medium of claim 1, wherein the instructions, when executed, assist a user by predicting at least one of a next word or phrase using a prediction model that includes:

$$P(w_n|w_{n-N+1}^{n-1}) = k_n \frac{C(w_{n-N+1}^n)}{C(w_{n-N+1}^{n-1})} + k_{n-1} \frac{C(w_{n-N+2}^n)}{C(w_{n-N+2}^{n-1})} + \ldots + k_1 \frac{C(w_n)}{n}$$

wherein,
w represents a word where $w_1$ is the oldest word, $w_2$ is the next oldest word, ... and $w_n$ is the next word or phrase to be predicted;
$w_m^n$ represents a sequence of words, from $w_n$, to $w_n$;
$W_{n-N+1} \ldots w_{n-1}$ represents a sequence of preceding candidates;
$P(w_n)$ represents the probability of $w_n$;
$P(w_n|w_m^{n-1})$ represents the probability of the at least one of the next word or phrase ($w_n$) given a preceding sequence $w_m^{n-1}$;
$C(w_m^n)$ represents a number of times that a sequence of candidates $w_m \ldots w_n$ exists in a data store;
$k_i$ represents an interpolation coefficient, where $\Sigma_i k_i = 1$;
n represents a number of words in the data store; and,
N represents a number that specifies a length of a candidate sequence used to predict a number of candidates.

11. The computer-readable storage medium of claim 10, wherein the instructions, when executed, assist a user by predicting the at least one of the next word or phrase using the prediction model and a preceding sequence of words, wherein the preceding sequence of words is determined based in part on the value of N.

12. The computer-readable storage medium of claim 1, wherein the instructions, when executed, assist a user by ranking the number of predicted textual candidates and suggesting certain textual candidates having a rank that is greater than or equal to a ranking threshold.

13. The computer-readable storage medium of claim 1, wherein the instructions, when executed, assist a user by collecting user input and storing the collected user input as a text stream in chronological order, wherein the text stream can be used when predicting the number of candidates.

14. A system to assist a user comprising
a computing device comprising a memory and a processor that is communicatively coupled to the memory;

an input component to receive user input to the computing device;

a store component that stores the input in chronological order;

a prediction component coupled to the memory that functions to predict a textual candidate selected from at least one of a next word or a phrase that is associated with the user input, wherein the predicting comprises:

determining a textual candidate probability using one or more preceding words in the store component and an n-gram probability model, wherein each textual candidate probability is based in part on a first quantity that corresponds with a number of times the textual candidate follows the number of preceding textual words in the store component and the number of times that the number of preceding textual words occur in the store component and a second quantity that corresponds with a number of times the textual candidate is observed in the store component and the total number of words in the store component;

a suggestion component to suggest the textual candidate as a suggested candidate, wherein the suggestion is produced by:

selecting a number of top textual candidates based on the textual candidate probabilities;

determining adjusted probabilities of the selected top textual candidates, wherein each adjusted candidate probability is based in part on a candidate rank function multiplied by a first variable and an associated textual candidate probability multiplied by a second variable, wherein the candidate rank function is based in part on a third quantity that corresponds with the selected top textual candidate rank values; and the store component of the computing device storing the textual candidate.

15. The system of claim 14, wherein the n-gram probability model comprises:

$$P(w_n | w_{n-N+1}^{n-1}) = k_n \frac{C(w_{n-N+1}^n)}{C(w_{n-N+1}^{n-1})} + k_{n-1} \frac{C(w_{n-N+2}^n)}{C(w_{n-N+2}^{n-1})} + \ldots + k_1 \frac{C(w_n)}{n}$$

wherein, w represents a word ($w_1$ is the oldest word, $w_2$ is the next oldest word, . . . and $w_n$ is the textual candidate to be predicted);

$w_m^n$ represents a sequence of words, from $w_m$ to $w_n$;

$w_{n-N+1} \ldots w_{n-1}$ represents a sequence of preceding words;

$P(w_n)$ represents the probability of $w_n$;

$P(w_n | w_m^{n-1})$ represents the probability of the textual candidate ($w_n$) given a preceding sequence $w_m^{n-1}$;

$C(w_m^n)$ represents a number of times that a sequence of candidates $w_m \ldots w_n$ exists in the store component;

$k_i$ represents an interpolation coefficient, where $\Sigma_i k_i = 1$;

n represents a number of words in the store component; and,

N represents a number that specifies a length of a candidate sequence used to predict the textual candidate.

16. The system of claim 14, wherein the prediction component is further configured to rank the textual candidate and compare the rank of the textual candidate with one or more other predicted candidate rankings.

17. The system of claim 14, further comprising a collection component to collect user input including a selected textual candidate and to store the collected user input and selected textual candidate as a text stream in chronological order to the store component.

18. A method of assisting a user comprising:

receiving textual input at a computing device;

storing the input in a store component in a chronological order;

predicting at least one of a predicted next word or a predicted phrase based in part on the user input and a number of preceding textual words in the store component, wherein the predicting comprises:

determining a number of textual candidate probabilities, wherein each textual candidate probability is based in part on a first quantity that corresponds with a number of times the textual candidate follows the number of preceding textual words in the store component and the number of times that the number of preceding textual words occur in the store component and a second quantity that corresponds with a number of times the textual candidate is observed in the store component and the total number of words in the store component;

recommending at least one of the predicted next word or predicted phrase by:

selecting a number of top textual candidates based on the textual candidate probabilities;

determining adjusted probabilities of the selected top textual candidates, wherein each adjusted candidate probability is based in part on a candidate rank function multiplied by a first variable and an associated textual candidate probability multiplied by a second variable, wherein the candidate rank function is based in part on a third quantity that corresponds with the selected top textual candidate rank values; and storing at least one of a selected predicted word or a predicted phrase in the store component.

19. The method of claim 18, further comprising determining if a separator is included as part of the textual input and automatically storing the textual input to a data store if the separator is present.

20. The method of claim 19, further comprising automatically suggesting a next word without requiring further input if the separator is included as part of the textual input.

* * * * *

UNITED STATES PATENT AND TRADEMARK OFFICE
CERTIFICATE OF CORRECTION

PATENT NO. : 7,809,719 B2
APPLICATION NO. : 11/704111
DATED : October 5, 2010
INVENTOR(S) : Kenji Furuuchi et al.

Page 1 of 1

It is certified that error appears in the above-identified patent and that said Letters Patent is hereby corrected as shown below:

In column 16, line 36, in Claim 10, delete "$w_n$," and insert -- $w_m$ --, therefor.

Signed and Sealed this
Tenth Day of May, 2011

David J. Kappos
*Director of the United States Patent and Trademark Office*